United States Patent
Bickel et al.

[11] Patent Number: 6,150,972
[45] Date of Patent: Nov. 21, 2000

[54] PROCESS FOR COMBINING MULTIPLE PASSES OF INTERFEROMETRIC SAR DATA

[75] Inventors: Douglas L. Bickel; David A. Yocky; William H. Hensley, Jr., all of Albuquerque, N. Mex.

[73] Assignee: Sandia Corporation, Albuquerque, N. Mex.

[21] Appl. No.: 09/128,371

[22] Filed: Aug. 3, 1998

[51] Int. Cl.$^7$ .................................................... G01S 13/90
[52] U.S. Cl. ......................... 342/25; 342/190; 342/191; 342/195
[58] Field of Search ............................ 342/25, 175, 176, 342/179, 192, 193, 194, 195, 196, 197, 190, 191; 367/87, 88

[56] References Cited

U.S. PATENT DOCUMENTS

| | | | |
|---|---|---|---|
| 4,101,891 | 7/1978 | Jain et al. | 342/25 |
| 4,551,724 | 11/1985 | Goldstein et al. | 342/25 |
| 4,727,373 | 2/1988 | Hoover | 342/25 |
| 5,160,931 | 11/1992 | Brown | 342/25 |
| 5,170,171 | 12/1992 | Brown | 342/25 X |
| 5,189,424 | 2/1993 | Brown | 342/25 |
| 5,608,405 | 3/1997 | Pritt | 342/25 |
| 5,831,563 | 11/1998 | Barnes et al. | 342/25 X |
| 5,835,055 | 11/1998 | van der Kooij | 342/25 |

FOREIGN PATENT DOCUMENTS

| | | | |
|---|---|---|---|
| 7-199804 | 8/1995 | Japan | G09B 29/00 |

*Primary Examiner*—Bernarr E. Gregory
*Attorney, Agent, or Firm*—George H Libman

[57] ABSTRACT

Interferometric synthetic aperture radar (IFSAR) is a promising technology for a wide variety of military and civilian elevation modeling requirements. IFSAR extends traditional two dimensional SAR processing to three dimensions by utilizing the phase difference between two SAR images taken from different elevation positions to determine an angle of arrival for each pixel in the scene. This angle, together with the two-dimensional location information in the traditional SAR image, can be transformed into geographic coordinates if the position and motion parameters of the antennas are known accurately.

12 Claims, 4 Drawing Sheets

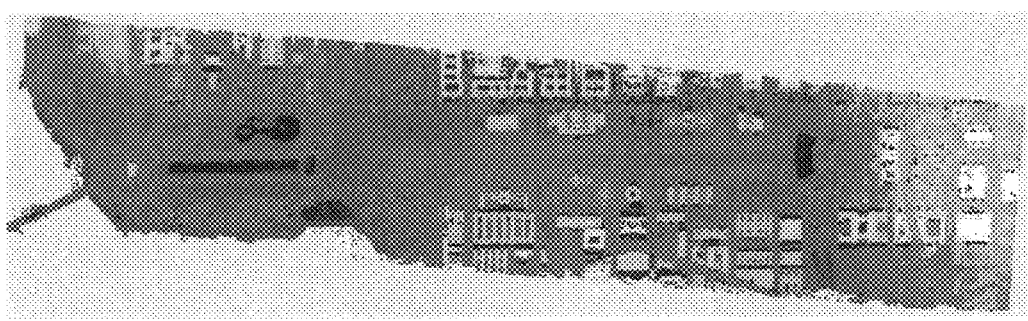
Fig. 4A — Elevation Model
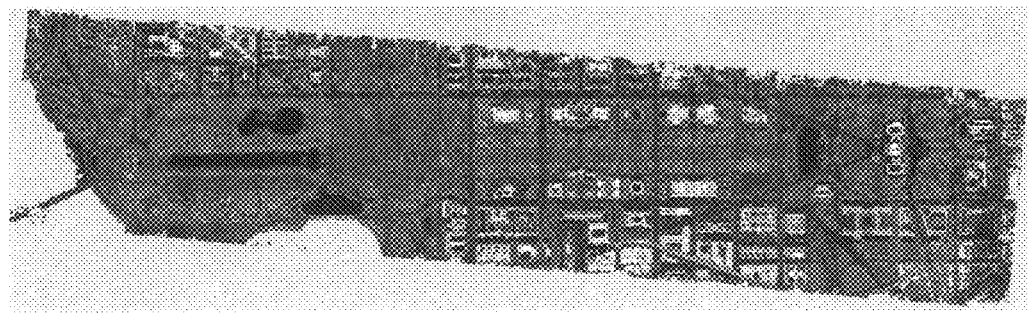
Fig. 4B — Orthorectifed SAR Image

PROCESS FOR COMBINING MULTIPLE PASSES OF INTERFEROMETRIC SAR DATA

The U.S. Government has rights in this invention pursuant to Department of Energy Contract No. DE-AC04-94AL85000 with Sandia Corporation.

BACKGROUND OF THE INVENTION

Interferometric synthetic aperture radar (IFSAR) is a promising technology for a wide variety of military and civilian topographic modeling requirements. IFSAR extends traditional two dimensional SAR processing to three dimensions by utilizing the phase difference between two SAR images taken from different elevation positions to determine an angle of arrival for each pixel in the scene. This angle, together with the two-dimensional location information in the traditional SAR image, can be transformed into geographic coordinates if the position and motion parameters of the antennas are known accurately.

Radar systems have been used for decades because of their ability to penetrate fog, clouds, and darkness. A synthetic aperture radar (SAR) typically moves a single antenna along a path and collects a single channel data from many positions along the path. Because scanning is provided by the movement of the antenna, a small SAR antenna has the ability to have the resolution of a very large antenna. SAR systems currently have the ability to make images having resolution on the order of less than a meter.

In contrast, an IFSAR typically comprises a pair of antennas, which moves along a path and collects at least two channels of data from many positions along the path or alternatively has a single antenna but moves along two different paths. IFSAR has the ability to make elevation models from extremely long stand-off ranges. For example, a system in low-Earth orbit may provide elevation accuracy on the order of a meter. However, because a SAR uses range to measure ground distance, it cannot be operated looking directly down on a target, so shadowing (where a tall object hides whatever is behind it) and layover (where the reflection from the ground in front of a tall object arrives at the antenna at the same time as a reflection from the object) are significant problems. Unfortunately, when multiple reflectors occur within a single SAR range bin, incorrect elevations are obtained as a result of producing a weighted average from the multiple reflectors. Moreover, a "front porch" effect can be obtained that not only mischaracterizes elevation, but also distorts the horizontal extent of the topographic feature of interest.

An overview of IFSAR is provided by D. Bickel et al., "Design, Theory, and Applications of Interferometric Synthetic Aperture Radar for Topographic Mapping," Sandia National Laboratories Report SAND96-1092, May 1996, available through DOE/OSTI, which is incorporated into this patent specification by reference thereto.

Presently, optical stereo height measurements are used almost exclusively to measure building heights. Such a process uses stereo optical points to determine height. The difficulty with this process is that it requires tedious selection of points by human operators. On the other hand, the present IFSAR technique uses the phase information in the returning signals and can be automated or nearly automated with a significant reduction in processing time.

SUMMARY OF THE INVENTION

It is an object of this invention to solve the problem of incorrect building heights which arise when multiple SAR reflectors occur at different heights in a single SAR range bin.

It is another object of this invention to combine IFSAR data from multiple passes, the minimum being two passes with opposite looks, and use coherence filtering to improve the accuracy of determining building height and size.

Additional objects, advantages, and novel features of the invention will become apparent to those skilled in the art upon examination of the following description or can be learned by practice of the invention. The objects and advantages of the invention can be realized and attained as particularly pointed out in the appended claims.

To achieve the foregoing and other objects, and in accordance with the purpose of the present invention, as embodied and broadly described herein, the present invention can comprise a method of determining the height of objects in an area utilizing slant range IFSAR data including collecting IFSAR data on the area from two passes of an IFSAR system along different sides of the area, the data providing an indication of a vertical component of any object in each portion facing the IFSAR system during a pass. During signal processing, for each portion of the area, height information is determined using only the IFSAR data of the pass. The method is preferably accomplished by utilizing within each portion the data having the greater coherence.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 3 depicts the effect overlay in determining the vertical height of buildings and the like.

FIG. 4a is an elevation map obtained according to the present invention for the Washington D.C. mall area.

FIG. 4b is an intensity map obtained according to the present invention corresponding to the elevation map of FIG. 4a.

DETAILED DESCRIPTION OF THE INVENTION

Synthetic aperture radars are active microwave systems whose radiation, emitted and then back scattered and collected by the radar, is captured as wave front data containing both amplitude and phase information. IFSAR data is collected in radar coordinates (i.e., range and azimuth) and then mapped into Cartesian coordinates. This process is called orthorectification.

Figure 1:
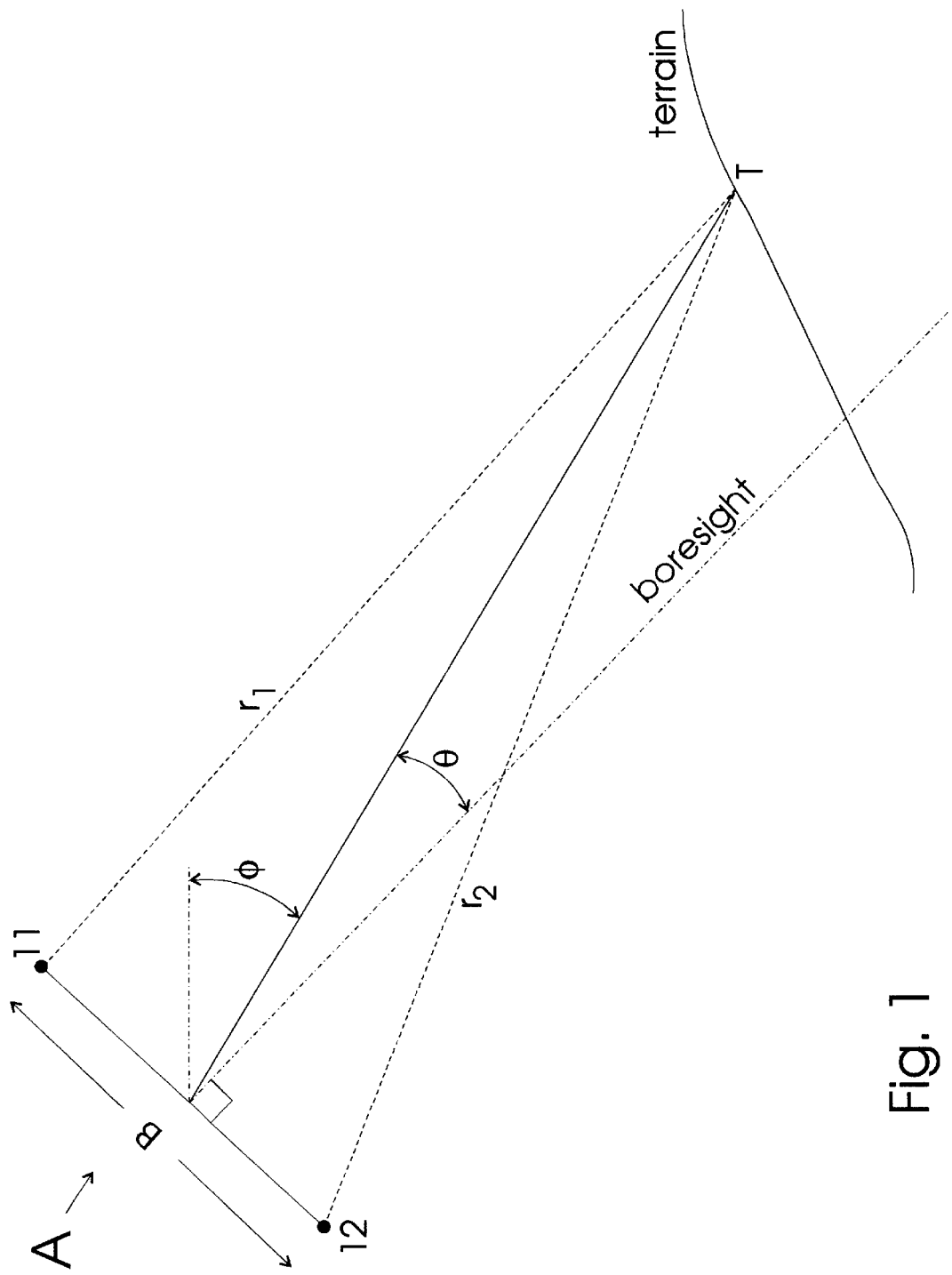
FIG. 1 depicts a simplified IFSAR system according to the present invention.

FIG. 1 shows a schematic representation of an IFSAR system A to preferably include a pair of antennas 11, 12 spaced apart a distance B and mounted on a vehicle such as an aircraft or spacecraft moving perpendicular to the image of the figure. A radar pulse, preferably a chirp pulse, is transmitted that reflects from target T spaced by an angle $\theta$ from a boresight extending perpendicular from the IFSAR system A.

Figure 2:
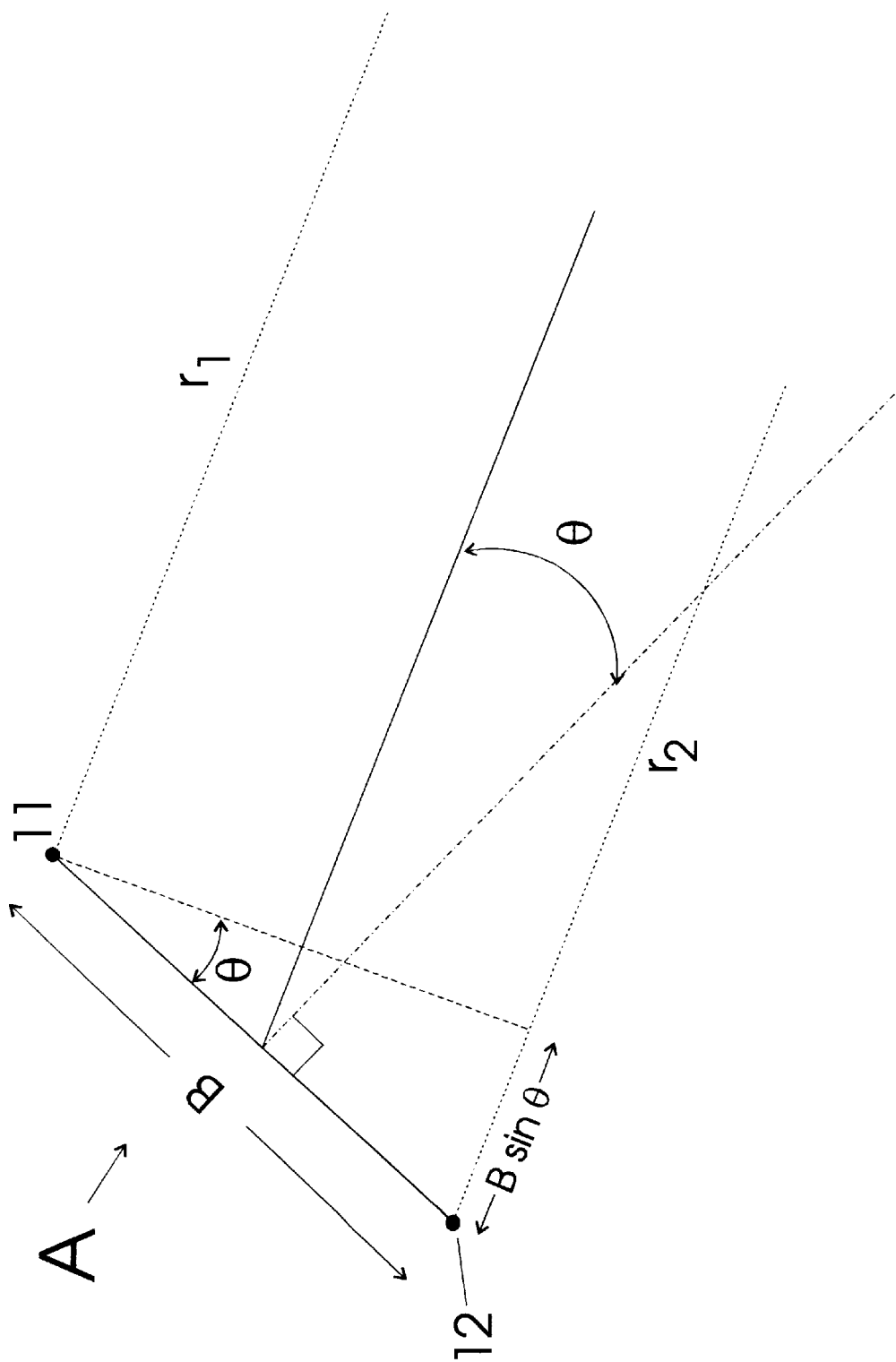
FIG. 2 depicts the assumption of parallel travel paths of an IFSAR system.

The direction of arrival angle $\theta$ can be related to the difference in path length of the radar pulse 14 to and from target T and detected by antennas 11, 12 by $\Delta r = r_1 - r_2$. Since the range to the target T is large and the separation distance B between antennas 11, 12 is small, the difference in path length, can be approximated by $\Delta r = r_1 - r_2 \approx -B \cdot \sin\theta$ as depicted in FIG. 2.

As with optical interferometric systems, IFSAR measures the path-length difference between two different paths traveled by an electomagnetic wave. To resolve the phase-difference measurements to less than $2\pi$ changes, the argument of the cross-correlation or coherence of the two SAR images is taken. In the ideal situation, a change in the argument of the coherence should only be due to a phase difference induced by a difference in path length observed from the two IFSAR perspectives. In this ideal case, the phase resolution would be infinitely fine. However, in the real situation there is loss of coherence due to thermal and other sources of noise (e.g., multiplicative noise, range and azimuth ambiguities, precision errors), motion of the target, unsensed motion of the IFSAR, image formation phase errors, image registration errors, and finite spatial resolution and target geometry characteristics.

The difference in geometry of the two antennas 11,12 of FIG. 1 allows the mapping of terrain height via phase difference, which can be measured by complex multiplication of the signals from the two antennas, $s_{ij}=g_{ij}*h_y= |g_{ij}*h_{ij}|e^{j\Psi_{ij}}$, where $s_{ij}$ is the output complex signal, $g_{ij}$ is the first registered complex image, $h_{ij}$ is the second registered complex image, all for the i-th range index and the j-th azimuth index, * indicates the complex conjugate, and $\Psi_{ij}$ is the phase difference.

The phase difference is related to terrain or object height z by $dz/d\Psi = r\ cos\ \phi/kB$, where k is the IFSAR center wavenumber, r is the slant range distance, and $\phi$ is the depression angle as shown in FIG. 1.

Along with height information, more information can be obtained by using the maximum likelihood estimate of the coherence:

$$\mu = \frac{\left|\sum_i \sum_j g_{ij}^* \cdot h_{ij}\right|}{\sqrt{\left|\sum_i \sum_j |g_{ij}|^2 \cdot \sum_i \sum_j |h_{ij}|^2\right|}} \quad \text{Eq. 2}$$

where the summation is over the number of complex looks. A totally coherent pair of images would yield a correlation matrix of all ones. Any decorrelation would deviate from unity. Values of 0.5 or less are common for decorrelation values. IFSAR correlation is called coherence because it is analagous to the optical mutual coherence function.

An important application of the estimate of the coherence as given in equation 2 is that it helps provide an estimate of the noise that can be expected in the final IFSAR map.

Once the relative height and ground-range position for each pixel of an IFSAR image have been computed in a manner known to those skilled in the art, the IFSAR data is ortho-rectified, i.e., mapped into Cartesian coordinates consistent with an x-y grid. This process is a many-to-one mapping on a pixel-by-pixel basis. In other words, the data is presented as if the viewer were looking straight down on the target, and not presented at the angle it was measured.

Figure 3:
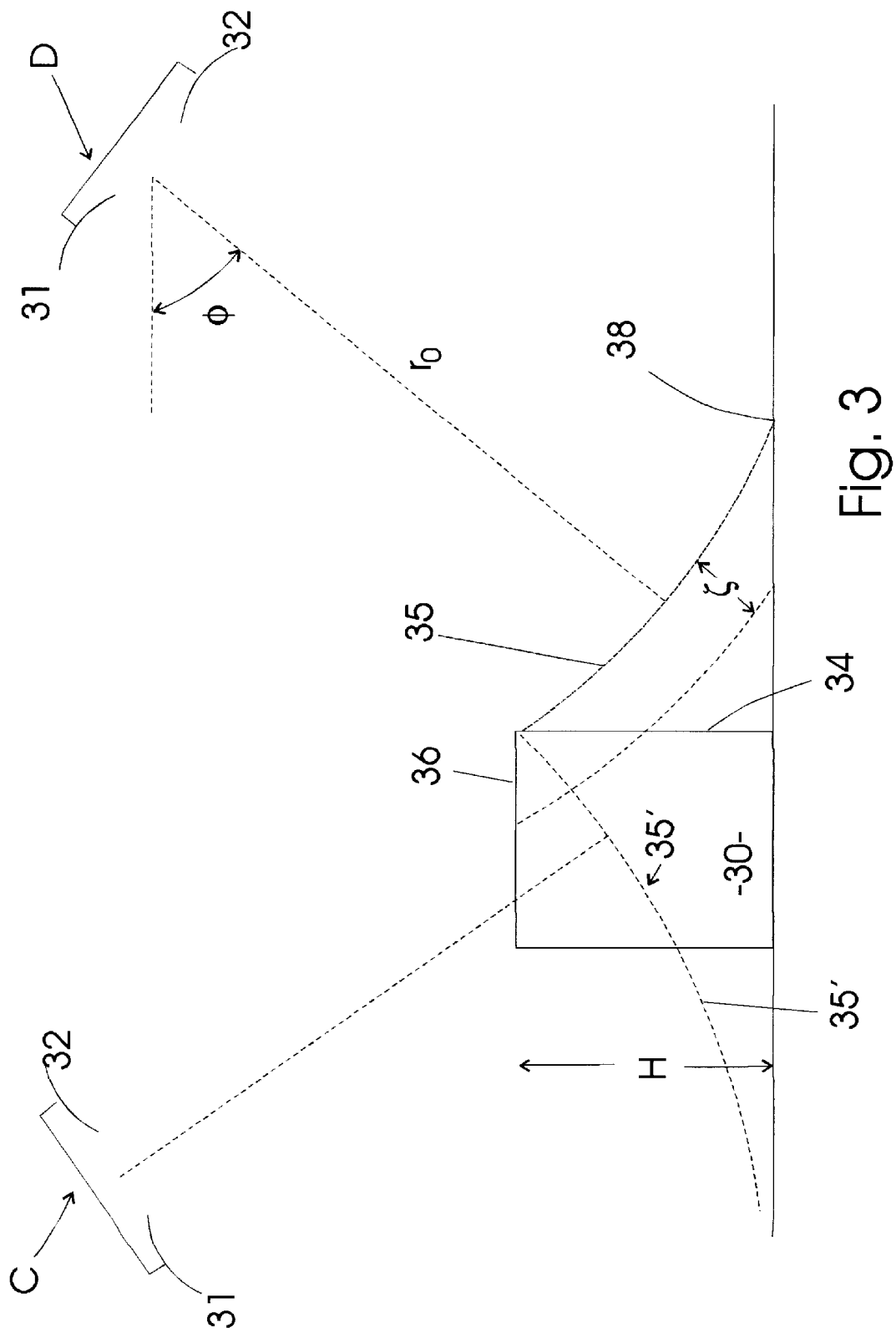

IFSAR systems are built with the assumption that there is only one height sample per range-Doppler bin $\rho_r$. In the case of layover, depicted in FIG. 3, this assumption is invalid. In FIG. 3, the front 34 of building 30 is illustrated with two competing samples, one at the top 36 of the building and one on the ground 38 between the building 30 and IFSAR D. These samples result from the intersection of the wave 35 from IFSAR D with points equidistant from the distant antennas 31, 32 of IFSAR D, which system is unable to discriminate between returns on the same order of magnitude in intensity from these locations. Both the range and height values determined by IFSAR D from these multiple returns can be anywhere between the equidistant points within the range shell shown in the figure. The location within the range shell is determined by the ratio of the return from the top of the building 36 to that of the bottom of the building. If the backscatter coefficients for the top and the bottom of the building are similar, the result is that the front edge 34 of building 30 is shortened and pulled forward creating a false 'front-porch' on the building. In a regular SAR image, the building appears to lay over towards the SAR system, with an undefined shadow behind the laid over image. Conversely, and as shall be discussed below, IFSAR C does not suffer from these defects.

The effects of layover in terms of estimated height as well as coherence can be explained by the Van Cittert-Zernike theorem, as discussed by E. Rodriguez et al., "Theory and design of interferometric synthetic aperture radars", IEE Proceedings-F, Vol. 139, No. 2, April 1992, pp. 147–159. This theorem states, given an incoherent source distribution, that the mutual coherence of the source is given by the Fourier Transform of the source distribution, or $$\mu(x_1, y_1; x_2, y_2) = \frac{\int\int I(\xi,\eta) \exp\left[\frac{j2\pi}{\lambda}(\Delta x \xi + \Delta y \eta)\right] d\xi d\eta}{\int\int I(\xi,\eta) d\xi d\eta} \quad \text{Eq. 3}$$

in a normalized form, where I( ) is the source intensity distribution function, $\Delta x=x_2-x_1$, and $\Delta y=y_2-y_1$ paraxial approximations, meaning the distance to the SAR is much larger than the extent of the targets.

More specifically as applied to building such as in FIG. 3, the normalized complex coherence can be shown to be:

$$\mu \approx \frac{\sin(\pi \cdot X)}{\pi \cdot X} \cdot \left\{\beta \cdot \exp\left[j \cdot \alpha \cdot \left(\frac{H}{2}\right)\right] + (1-\beta) \cdot \exp\left[j \cdot \alpha \cdot \left(-\frac{H}{2}\right)\right]\right\} \quad \text{Eq. 4}$$

where:

$$X = \frac{2 \cdot B \cdot \rho_r \cdot \tan\phi}{r_0 \cdot \lambda}; \quad \beta = \frac{I_{roof}}{I_{roof} + I_{ground}}; \quad \alpha = \frac{4 \cdot \pi \cdot B}{\lambda \cdot r_0 \cdot \cos\phi}$$

B—is the orthogonal component of the baseline, $I_{roof}$, $I_{ground}$—intensity of return from roof and ground respectively;

$\lambda$—is the wavelength of the radar;

$r_0$—is the range to the target; and $\rho_r$—is slant range resolution FIG. 3

$\phi$—is depression angle

H—is building height

Equation 4 leads to two deductions: First, the height of the building will be biased to the stronger return area. Because of $\beta$, if the roof has the stronger return, the roof height provides the estimate. The converse is true for brighter ground returns. If the ground and roof returns are similar, building height is indicated as a height in between.

Second, the magnitude of the coherence also contains geometry information. As an example, if $\beta$ goes to 0.5, then the magnitude of the coherence is modulated by a cosine function whose frequency is determined by the height of the building. Hence, the coherence can be used as an indicator of problems due to layover. This phenomenon is strongly related to the volume-scattering effect discussed in J. Hagberg et al., "Repeat Pass SAR Interferometry Over Forested Terrain", IEEE Transactions on Geoscience and Remote Sensing, Vol. 33, No. 2, March 1995, pp. 331–340, and other articles.

The implication of equation 4 is that coherence can be used to detect areas where information is received from more than one target within the same range-Doppler bin.

This invention utilizes the observation that if the IFSAR antenna were flown along path C, as depicted in FIG. 3 on the opposite side of building 30, the signal from top 36 adjacent side 34 does not exhibit layover because at portion 36 of the scene, there is only one return to IFSAR C from wavefront 35'. Accordingly, the signal from C provides a clean measurement of the height H of building 30. This observation led to the realization that in ortho-rectified data sets, the coherence for the 'front porch' height data was lower than the coherence from the ground or from the building. Therefore, if the IFSAR coherence is high, the IFSAR returns come from points close to each other, which means the same object. If the coherence is relatively low, the height measurement is from two or more contributors separated in the scene.

In other words, IFSAR D provides an indication of a vertical component of the building (side 34) facing IFSAR D in the portion of building 30 being illuminated. However, IFSAR C, on the opposite side of the building 30, has no vertical component of building 30 in portion 36 of the scene; it only sees the relatively flat roof of building 30.

Orthorectification of IFSAR data is difficult when the slant range ro contains several such samples from different elevations along the side of a building. For terrain, the height selected corresponds to the maximum coherence. However, the maximum coherence from buildings often does not correspond to the top of the building. In fact, it often is generated by a strong dihedral return off the front of a building. To find the top of a building, the proper coherence function for the building must be determined. To keep track of the information in the many-to-one mapping required for orthorectification, the following data types are recorded: maximum coherence, height of maximum coherence, maximum height, coherence of maximum height, and number of values.

According to this invention, IFSAR data from different directional passes are combined and the data from the side having better coherence and more consistent height is used to replace the 'front porch' with more reliable data. This system combines multi-pass IFSAR data, uses the height calculations from the IFSAR processing, and combines them according to coherence, using the following parameters determined from an orthorectified IFSAR data set from each pass:

Height with maximum coherence—ZMC

Height with maximum value—MZ

Coherence of maximum height value—CMZ

Maximum coherence—MC.

For each orthorectified pixel, the IFSAR data from each pass is compared to determine height $Z_n$ and coherence $C_n$ according to the following rules:

1. If $CMZ_n \geq t$, then $Z_n = MZ_n$ and $MZ_n = CMZ_n$ else $Z_n = ZMC_n$ and $C_n = MC_n$.

Where n is the number of the pass of the IFSAR, and t is a defined threshold measure of coherency Given two opposite side passes, n=1, 2.

Combine passes using

2. If $C_1 > C_2$ then $Z_1, C_1$; else $Z_2, C_2$.

In other words, for each pixel of a given pass, if the coherence of the maximum height value is greater than a specified threshold of coherency, then the height with the maximum value is the best height estimate for that pixel. Using this maximum height and its corresponding coherence a topographical mapping can be produced. However, if the coherence of the maximum height value is less than the threshold, then use the height with maximum coherence and the maximum coherence. Do this for each IFSAR pass separately. To combine passes, choose the corresponding pixel with the highest coherence thus forming a single, more accurate height map plus a coherence map from all the passes. For a building, there is a reasonably high probability that if a front porch occurs on one side, then the other side of the same edge of the building will not show this feature and will provide a true indication of height.

While the system has been illustrated with two passes on opposite sides of building 30, a greater number of slant passes can also be used, with the data from only the pass showing the maximum coherence in each portion (or pixel) of the ortho-rectified area being used for the height determination.

Implementation of this system in a computer is a routine matter. The input data is routinely collected by the IFSAR system, and the required values are relatively simple calculations for the computer which processes the IFSAR image.

The results of one test of this invention are shown in FIGS. 4a and 4b, a digital elevation model which was generated by flying an IFSAR with less than one meter resolution on opposite sides of the Washington, D.C. mall (at night and through cloud cover) and registering the images. Each height pixel was chosen based upon the highest coherence. For this test, t=0.8. The data was orthorectified to form FIG. 4 with a pixel area on the order of 2 meters square.

While the examples are set forth herein have been limited determining and preparing elevation and coherency map of man made objects, those skilled in the art will appreciate that the present invention can be more broadly applied to the general field of topography wherein terrain as well as other features can be mapped (e.g. trees). The particular sizes and equipment discussed above are cited merely to illustrate a particular embodiment of this invention. It is contemplated that the use of the invention may involve other embodiments as long as the principle of using height data from the side of the object that does not exhibit a unreliable height information such as a 'front porch', is followed. For example, if we can obtain some apriori information about the parameter, β, in equation 4, then we could back out the geometry information from the magnitude of the coherence even with a single pass. It is intended that the scope of the invention be defined by the claims appended hereto.

What is claimed is:

1. A method for determining the height of objects in an area utilizing IFSAR data comprising:

collecting IFSAR coherence and height data on the area from at least two passes of the IFSAR system, forming an ortho-rectangular map of the area from the collected data, the height information for each portion of the map being derived only from the data of the single pass having the highest coherence at that portion.

2. The method of claim 1, wherein there are two passes, the first pass being parallel to the second pass.

3. The method of claim 1, wherein the coherence at each portion for each pass is (A) the coherence of the maximum height value of that portion during the pass if that value is greater than or equal to a predetermined threshold; and (B) the maximum coherence of that portion during the pass if the coherence of maximum height is less than the predetermined threshold.

4. The method of claim 3, wherein the height value for that portion is the maximum height of the portion if the coherence is (A) and the height value is the height with maximum coherence if the coherence is (B).

5. The method of claim 1, wherein at least two passes of IFSAR system are along different sides of the area.

6. The method of claim 1, wherein the IFSAR data for each pass includes: height with maximum coherence (zmc); height with maximum value (mz); coherence of maximum height value (cmz), of maximum coherence (mc).

7. The method of claim 6, wherein the IFSAR data of each pass are compared to determine height and coherency for the determined height according to:

(A) for each orthorectified pixel for the IFSAR data if $CMZ_n \geq t$ then height $(Z_n)=MZ_n$ and coherence $(C_n)=MC_n$ where n is the number of the pass of the IFSAR and t is a threshold measure of coherency; and (B) for $C_n > C_{n+1}$ select $Z_n$ and for $C_n < C_{n+1}$ select $Z_{n+1}$ and $C_{n+1}$.

8. The method of claim 1, wherein the value of coherence is obtained according $$\mu(x_1, y_1; x_2, y_2) = \frac{\int\int I(\xi, \eta) \exp\left[\frac{j2\pi}{\lambda}(\Delta x \xi + \Delta y \eta)\right] d\xi d\eta}{\int\int I(\xi, \eta) d\xi d\eta}$$

in a normalized form, where I( ) is the source intensity distribution function, $\Delta x = x_2 - x_1$, and $\Delta y = y_2 - y_1$.

9. The method of claim 1, wherein the value of coherence is obtained according to $$\mu \approx \frac{\sin(\pi \cdot X)}{\pi \cdot X} \cdot \left\{\beta \cdot \exp\left[j \cdot \alpha \cdot \left(\frac{H}{2}\right)\right] + (1-\beta) \cdot \exp\left[j \cdot \alpha \cdot \left(-\frac{H}{2}\right)\right]\right\}$$

where:

$$X = \frac{2 \cdot B \cdot \rho_r \cdot \tan\phi}{r_0 \cdot \lambda}; \quad \beta = \frac{I_{roof}}{I_{roof} + I_{ground}}; \quad \alpha = \frac{4 \cdot \pi \cdot B}{\lambda \cdot r_0 \cdot \cos\phi}$$

B—is the orthogonal component of the baseline;

$I_{roof}$, $I_{ground}$—intensity of return from roof and ground respectively;

$\lambda$—is the wavelength of the radar;

$r_0$—is the range to the target; and $\rho_r$—is slant range resolution $\phi$—is depression angle H—is building height.

10. A method of determining the height of objects in an area utilizing slant range IFSAR data comprising:

dividing the area into a plurality of portions;

collecting IFSAR data on each portion from multiple passes of an IFSAR system along at least two sides of the area, the data for each pass providing an indication of a vertical component of any object facing the IFSAR system in each portion of the area, the indication of variation in height being a function of the coherence of the data; and for each portion of the area, utilizing only the IFSAR data of the pass which has the least variation of height in that portion to determine the height of an object in that portion.

11. The method of claim 10, further comprising forming an ortho-rectangular map of the area from the collected data, wherein the area of the map consists of the sum portions of the area.

12. The method of claim 11, wherein each portion covers an area of the ortho-rectangular map less than 2 meters square.

* * * * *